United States Patent [19]

Nakamoto et al.

[11] 3,991,024

[45] Nov. 9, 1976

[54] NOVEL CURABLE RESIN AND PREPARATION THEREOF

[75] Inventors: Hideo Nakamoto; Juichi Kobayashi; Takashi Kobayashi, all of Nagoya, Japan

[73] Assignee: Mitsubishi Rayon Co., Ltd., Tokyo, Japan

[22] Filed: Dec. 16, 1974

[21] Appl. No.: 533,292

[30] Foreign Application Priority Data
Dec. 21, 1973  Japan.............................. 48-142407
Apr. 24, 1974  Japan.............................. 49-45482

[52] U.S. Cl............................. 260/18 TN; 106/27; 204/159.19; 260/23 TN; 260/77.5 CR; 260/468 E; 260/471 C; 260/482 B
[51] Int. Cl.².......................................... C08G 18/32
[58] Field of Search......... 260/468 E, 471 C, 482 B, 260/77.5 CR, 18 TN

[56] References Cited
UNITED STATES PATENTS
3,876,518  4/1975  Borden et al.................... 260/482 B

*Primary Examiner*—M. J. Welsh
*Attorney, Agent, or Firm*—Oblon, Fisher, Spivak, McClelland & Maier

[57] ABSTRACT

A novel resin which is easily cured by crosslinking by irradiation of radiant or UV rays is prepared by combining a radical polymerizable compound (A) having a molecular weight of not more than 2000 and having at least two (meth)acryloyl group and one or more of hydroxyl group and a compound (B) having an alkyl or alkylene group with carbon atoms of 7 or more, at least one polymerizable unsaturated groups and at least one hydroxyl groups, by using a diisocyanate compound. This resin is very suitable as binder for ink.

8 Claims, No Drawings

NOVEL CURABLE RESIN AND PREPARATION THEREOF

This invention relates to a novel resin and preparation thereof. More particularly, this invention relates to a resin having favorable printing characteristics which can easily be cured by polymerization by irradiation of radiant rays, particularly electron beams or ultra-violet rays, and a process for producing the same.

The binders which have heretofore been used for printing inks are so called heat-set type ink binders which can easily be dried by heating by means of, for example, a heating oven. When printing is performed using such a heat-set type ink, the printed surface is dried by heating in an oven. The curing reaction of the ink is initiated by heat, followed further by oxidation polymerization in the air. Volatile organic solvents are contained in this type of ink and they are emitted during printing procedure into the air therefor cause serious hygienical problems or air pollution. A large heating oven is required to effect a high speed heating treatment in the drying procedure after printing because drying must be performed by heating and oxidation polymerization as mentioned above when printing is carried out using a heat-set type ink. Furthermore, when a substrate which is liable to be deformed by heating is printed by using the aforesaid heat-set type ink, the printed surface does not sufficiently dry when heated but remains slightly tacky. For prevention of adhesion between the resulting printed articles, such complicated operations as powder spraying or wind blowing on the printed surface have been practiced.

An object of the present invention is to provide a novel resin suitable for ink binders which can easily be cured by Polymerization by irradiation with radiant rays such as electron beams or ultra-violet rays.

Another object of the present invention is to provide a process for producing said resin.

The other object of the present invention is to provide an ink binder composition containing said resin.

Still another object of the present invention is to provide a paint binder composition containing said resin.

The present invention provides a novel resin comprising a compound of the formula:

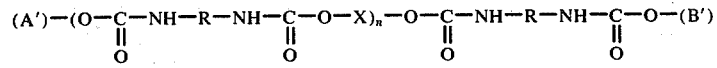

wherein A' is residual group of a free radical polymerizable compound (A) having a molecular weight of not more than 2000 and having at least two acryloyl or methacryloyl groups and one or more of hydroxyl groups; B' is residual group of a compound (B) having an alkyl or alkylene group having 7 or more and one or more carbon atoms of polymerizable unsaturated groups and hydroxyl groups, respectively; X is residual group of A' or B'; R is residual group of a diisocyanate compound; and $n$ is zero or a positive integer.

The product of the present invention can be produced by combining the aforesaid compounds (A) and (B) with a diisocyanate compound. According to one preferred embodiment for practicing the invention, the resin is produced by a process comprising adding 0.5 to 4 moles of diisocyanate to the radical polymerizable compound (A) per one mole of the hydroxyl groups contained therein to effect addition reaction, thereby introducing isocyanate groups at the terminal ends thereof, and then reacting the compound (B) with the thus modified radical polymerizable compound (A) at a molar ratio of 4/1 to 1/4 in terms of the hydroxyl groups in the compound (B) over those in the compound (A).

Alternatively, according to another preferred embodiment of the invention, the resin is produced by a process comprising adding 0.5 to 4 moles of a diisocyanate compound to the compound (B) per one mole of hydroxyl groups contained therein to effect addition reaction, thereby introducing isocyanate groups at the terminal ends thereof, and then reacting the free radical polymerizable compound (A) with the thus modified compound (B) at a molar ratio of 4/1 to 1/4 in terms of the hydroxyl groups in the radical polymerizable compound (A) over those in the compound (B).

The resin of the present invention has good wettability with the pigments as the binder for flat plate offset printing ink, since it contains as constituting elements a straight chain alkyl group or alkylene group. Accordingly, printing characteristics such as flowing property of printing ink or emulsion resistant property are excellent. Moreover, because the compounds (A) and (B) employed as the starting materials have the specific structures which can afford rapid polymerization curing of the printed surface by irradiation with radiant or UV rays, the drying property of the resin is extremely good. Furthermore, as the resin contains numerous urethane bonds, the ink made by using this resin as binder has excellent property adhesion property to the printed surface.

In view of the crosslinking of the resin when irradiated with radiant or UV rays when the resin of the present invention is utilized as ink binders, the hydroxyl containing radical Polymerizable compound (A) used as one of the starting materials should have a molecular weight of not more than 2000, preferably in the range from 200 to 2000. If a compound (A) having a molecular weight less than 200 is used as the starting material, the resin obtained has poor in curability at the time of irradiation with UV rays, the physical properties of the crosslinked, cured product are poor and the resin is no more suitable as ink binder. On the other hand, the resin obtained by using a compound (A) having a molecular weight above 2000 has increased viscosity. Accordingly, high speed printing characteristic is lowered remarkably when such a viscous resin is used as ink binder.

In order to enhance rapid drying property of the printing surface of the ink containing the resin of the present invention as binder at the time of irradiation of radiant or UV rays, it is required that the compound (A) employed as the starting material should have at least two acryloyl or methacryloyl groups. The compound (A) should also have at least one hydroxyl group to be bonded with diisocyanate, when we consider adhesion property to the substrate or other properties of the printed surface of the ink containing the resin as binder. No resin of the present invention can be derived from the starting material not containing these groups.

Typical examples of the radical polymerizable compounds (A) are as follows:

A-1: di or poly acrylates or methacrylates of polyols such as trimethylol propane, pentaerythritol, glycerine, and the like.

The compound (B) which is the other starting material of the present invention should contain an alkyl or alkylene group with carbon atoms of 7 or more, at least one polymerizable unsaturated group and at least one hydroxyl group. The resin obtained by using such a compound (B) is excellent in its flowing property as well as its affinity with the pigments and suitable as binders for inks or paints.

Typical examples of the compound (B) are as follows:

B-1: The addition reaction products of acrylic acid glycidyl ester or methacrylic acid glycidyl ester and a drying oil fatty acid or a semi-drying oil fatty acid having an alkyl or alkylene group with carbon atoms of 7 or more, for example, oleic acid, linoleic acid, ricinoleic acid, linolenic acid or eleostearic acid;

B-2: The addition reaction products of acrylic acid or methacrylic acid, or monoester of hydroxyalkyl acrylates or methacrylates with dicarboxylic acids and monoglycidyl compounds having an alkyl or alkylene group with carbon atoms of 7 or more, for example, octyl glycidyl ether, dodecyl glycidyl ether, glycidyl oleate, glycidyl linolate, glycidyl eleostearate, glycidyl ricinolate, glycidyl linolenate, versatic acid monoglycidyl ester, etc.

The proportion of the amount of the compound (A) to that of (B) is preferably from 4/1 to 1/4 in terms of molar ratio. If the proportion is outside said range, crosslinking curability of the resin obtained at the time of irradiation of radiant or UV rays is poor. As the result, high speed drying property required when it is used for ink binders is damaged and therefore high speed printing property and coating processability are lowered. In addition, affinity of the resin with pigments and stability of the resin are also damaged.

According to the process of the present invention, the compound (A) or the compound (B) is first allowed to react with diisocyanate compound. The molar ratio of the diisocyanate compound to hydroxyl groups in the compound (A) or the compound (B) should be 0.5 to 4 moles per one mole of hydroxyl groups. If the molar ratio is less than 0.5/1, it is difficult to produce the resin of the present invention. Whereas, if it is more than 4/1, side reactions may occur to give a large quantity of by-products.

Typical examples of diisocyanate compounds which can be used for practicing the process of the present invention are hexamethylene diisocyanate, tolylene diisocyanate, xylylene diisocyanate, dimer acid diisocyanate, or addition reaction products of these isocyanates with water or other polyols.

The resin produced according to the process of the present invention can by itself be provided for use as resinous binder for ink. For the purpose of controlling its viscosity, curing property, film property, etc., other vinyl monomers or low molecular weight polyfunctional acrylates methacrylates can be used in combination in an amount of 50% by weight based on the weight of the resin obtained by the present invention. Examples of these vinyl monomers are 2-ethyl hexyl (meth)acrylate, benzyl (meth)acrylate, tetrahydrofurfuryl (meth)acrylate, and 2-hydroxypropyl (meth)acrylate. As polyfunctional (meth)acrylates, there are ethylene glycol di(meth)acrylate, pentaerythritol tri(meth)acrylate, dipentaerythritol penta(meth)acrylate, and 1,6-hexane di(meth)acrylate.

A printing ink can be prepared in the following manner by using the resin obtained according to the process of the present invention. With 100 parts by weight of the resin are mixed 10 to 50 parts by weight of pigments, 0.1 to 20 parts by weight of photopolymerization initiators such as benzoin, butyroin, benzoin butyl ether, anthraquinone or benzophenone and 0.01 to 5 parts by weight of stabilizers such as hydroquinone, p-benzoquinone or phenothiazine. The mixture is then blended on a roll mill to provide an ink composition.

The ink thus prepared is suitable for high speed printing and, when the surface printed by this ink is irradiated by electron beams or UV rays, it is rapidly cured by polymerization. The ink exhibits excellent adhesiveness to the printed substrate and can form a tack free printed surface.

When polymerization is effected by irradiation with electron beams an electron beam with acceleration voltage in the range from 0.2 to 1 MeV can be used at a dosage of 0.1 to 10 Mrad. On the other hand, when curing is performed by irradiation of UV rays, UV rays having wavelengths in the range from 2000 to 8000 A, preferably from 3000 to 4000 A, can be used.

The present invention is explained in further detail by referring to the following Examples, wherein "parts" signify "parts by weight".

EXAMPLE 1

Into a reactor equipped with a thermometer, a cooling pipe and a nitrogen injection pipe 150 parts of tolylene diisocyanate, 260 parts of trimethylol propane triacrylate, 2 parts of dimethylaminoethyl methacrylate and 1 part of hydroquinone monomethyl ether were introduced. While the inner temperature was maintained at 45° C, 300 parts of pentaerythritol triacrylate having a molecular weight of 298 and containing three acryloyl groups and one hydroxyl group were added to the mixture over 90 minutes. After the addition was completed, the reaction was carried out at 45° C for 60 minutes. Then, 328 parts of an addition product having an alkyl group of 12 carbon atoms and one hydroxyl group per molecule, obtained by addition reaction between dodecyl glycidyl ether and acrylic acid, were added dropwise to the reaction mixture. The reaction temperature was then elevated to 60° C, at which the reaction was carried out for 2 hours to obtain the final resin. (A = 1 mol; NCO = 0.94 mol; B = 1.04 mol; NCO/A = 0.94; A/B = 0.96).

The resin obtained was measured by chemical analysis of NCO groups in the urethanation reaction and also by IR analysis to determine the structure as shown below:

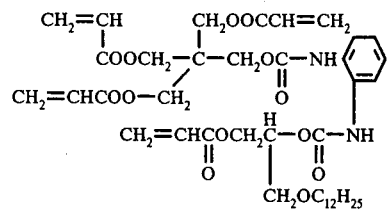

An ink prepared by blending 100 parts of said resin and 20 parts of Benzidine Yellow on a triple roll was printed on aluminum foil by means of RI tester type II. The printed surface was irradiated by electron beam under acceleration voltage of 300 KV at dose rate of 20 Mrad/sec. to dosage of 2 Mrad, whereby the ink was completely dried and the printed surface obtained was excellent in luster and wearing resistance.

EXAMPLE 2

Into the same reactor as used in Example 1 were introduced 252 parts of 1,6-hexane diisocyanate, 200 parts of lauryl acrylate and 2 parts of hydroquinone monomethyl ether. While the temperature was maintained at 45° C, 524 parts of epoxy diacrylate having a molecular weight of 530 and containing two acryloyl groups and two hydroxyl groups per molecule, which had been prepared by addition reaction between acrylic acid and a diepoxy compound (Epikote No. 828: Shell Chemical Co.) having an epoxy equivalent of 182 to 192 and a molecular weight of 355, were added dropwise over two hours to the mixture. Then, 396 parts of an addition product having an alkyl group of 17 carbon atoms and one hydroxyl group per molecule, prepared by subjecting glycidyl oleate and acrylic acid to addition reaction at a molar ratio of 1:1, were added to the mixture. The reaction was carried out at 60° C for 3 hours to obtain the final resin. (A = 2.0 mol; NCO = 1.19 mol; B = 0.964 mol; NCO/A = 0.56; A/B = 2.07). From chemical analysis of NCO groups in the urethanation reaction and IR analysis, the resin was confirmed to have the following structure:

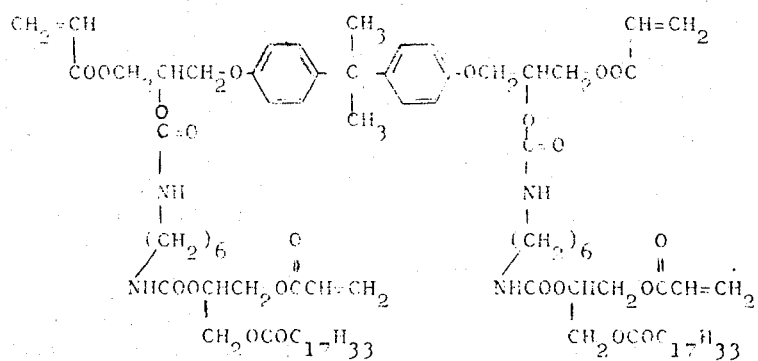

An ink was prepared in the same manner as in Example 1 by blending 100 parts of said resin and 20 parts of Phthalocyanine Green. This ink was printed on art paper by flat plate offset printing technique and the printed surface was irradiated by UV rays at a distance of 10 cm from a high pressure mercury lamp with output of 80 watt/inch for two seconds. The ink was completely cured.

EXAMPLE 3

Into the same reactor as used in Example 1 were introduced 120 parts of tolylene diisocyanate, 100 parts of 2-ethylhexyl acrylate and 0.5 parts of hydroquinone methyl ether and the mixture was maintained at 50° C. After 95 parts of pentaerythritol triacrylate having a molecular weight of 298 and containing three acryloyl groups and one hydroxyl group per molecule had been added dropwise over two hours into this mixture, 325 parts of an addition product having an alkyl group of 17 carbon atoms and containing one hydroxyl group per molecule, prepared by subjecting 280 parts of oleic acid and 150 parts of glycidyl methacrylate to addition reaction, were added to the mixture and the reaction was continued for 5 hours to obtain the resin. (A = 0.319 mol; NCO = 0.59 mol; B = 0.756 mol; NCO/A = 1.85; A/B = 0.42)

A printing ink obtained by blending similarly as in Example 1 100 parts of the resin obtained as described above and 15 parts of Phthalocyanine Blue was printed on aluminum foil by flat plate offset printing technique. Under the same conditions as in Example 1, the printed surface was irradiated by electron beam to dosage of 5 Mrad, whereby ink was completely cured and exhibited excellent adhesiveness and post-processability.

EXAMPLE 4

Into the same reactor as used in Example 1 were introduced 130 parts of xylene diisocyanate, 200 parts of 1,6-hexane diol diacrylate and 1 part of hydroquinone monomethyl ether. While the temperature was maintained at 60° C, 344 parts of the same epoxy diacrylate as used in Example 2 were added dropwise over two hours into the mixture. Then, 310 parts of an addition product having an alkyl group of 17 carbon atoms and containing one hydroxyl group per molecule, prepared by addition reaction between linoleic acid and glycidyl acrylate, were added to the mixture and the reaction was continued for 3 hours to obtain the resin. (A = 1.30 mol; NCO = 0.77 mol; B = 0.745 mol; NCO/A = 0.59; A/B = 1.74)

A printing ink, prepared in the same manner as in Example 1 by blending 100 parts of said resin, 10 parts of Brilliant Carmin FB and 3 parts of benzoin ethyl ether, was screen printed on steel plate. The printed surface was irradiated by UV rays for 15 seconds similarly as in Example 2, whereby the ink was completely cured to obtain a printed product excellent in adhesiveness and solvent resistance.

EXAMPLE 5

Example 4 was repeated except that 466 parts of an addition product having a molecular weight of 530 and containing two acryloyl groups and two hydroxyl groups per molecule, prepared by addition reaction between isophthalic acid and glycidyl methacrylate, were used in place of the epoxy diacrylate to obtain a resin for ink binder. (A = 1.30 mol; NCO = 0.77 mol; B = 0.745 mol; NCO/A = 0.59; A/B = 1.74).

A printing ink obtained similarly as in Example 1 by blending 100 parts of said resin and 15 parts of Phthalocyanine Blue was printed on tin plate by flat plate offset printing technique. Irradiation of electron beam was performed similarly as in Example 1 to dosage of 3 Mrad, whereby the ink was completely cured.

EXAMPLE 6

Into the same reactor as used in Example 1 were introduced 80 parts of tolylene diisocyanate and 70 parts of 2-ethylhexyl acrylate. While maintaining the temperature at 50° C, 120 parts of an addition product having an alkyl group of 17 carbon atoms and containing two hydroxyl groups, prepared by addition reaction between 190 parts of the same diepoxy compound as used in Example 2 and 280 parts of oleic acid, 262 parts of an addition product having a molecular weight of 530 and containing two acryloyl groups and two hydroxyl groups per molecule, prepared by addition reaction between 190 parts of a diepoxy compound (Epikote No. 828: Shell Chemical Co.) and 72 parts of acrylic acid were added dropwise over two hours into the mixture. The reaction was further proceeded for 5 hours to obtain the final resin. (A = 1.0 mol; NCO = 0.5 mol; B = 0.28 mol; NCO/B = 1.79; A/B = 3.5).

A printing ink prepared by blending 100 parts of said resin and 15 parts of Benzidine Yellow was offset printed on aluminum plate in thickness of two microns and irradiated by electron beam in the same manner as in Example 1 to dosage of 5 Mrad, whereby the ink was completely cured.

EXAMPLE 7

Into the same reactor as used in Example 1 were introduced 90 parts of furfuryl acrylate and 90 parts of xylylene diisocyanate and the mixture was heated at 50° C. Into this mixture were added dropwise 260 parts of an addition product having two alkylene groups of 17 carbon atoms and two hydroxyl groups per molecule, prepared by addition reaction between 190 parts of a diepoxy compound (Shodine No. 508: Showa Denko Co.) having an epoxy equivalent of 190 and a molecular weight of 414 and 190 parts of linoleic acid. Then, into the mixture containing the reaction product were added dropwise 420 parts of an addition product having a molecular weight of 308 and having two methacryloyl groups and a hydroxyl group, which had been prepared by addition reaction between 260 parts of glycidyl acrylate and 154 parts of isophthalic acid, whereby a resin solution containing the final resin of the present invention was obtained. (A = 2.0 mol; NCO = 0.485 mol; B = 0.56 mol; NCO/A = 0.866; A/B = 0.28).

A printing ink was obtained by blending 100 parts of said resin, 13 parts of Phthalocyanine Green and 4 parts of benzoin ethyl ether. This ink was offset printed on paper and irradiated by UV rays under the same conditions as in Example 2. The ink was completely cured.

COMPARATIVE EXAMPLE 1

For comparison, Example 1 was repeated except that 204 parts of an addition product of butyl glycidyl ether with acrylic acid was used in place of the addition product of dodecyl glycidyl ether with acrylic acid to obtain the resin. (A = 1.0 mol; NCO = 0.94 mol; B = 1.0 mol; NCO/A = 0.94; A/B = 1.0). Comparative tests were performed for the ink of Example 1 and the ink prepared from this resin similarly as in Example 1. The results of printing test (by using RI tester type II) for both inks and those of measurement of the lustre of printed articles produced therefrom which are cured by electron beam are set forth in Table 1.

Table 1

| | Example 1 | Comparative example 1 |
|---|---|---|
| Emulsification test | good | not good |
| Lustre of the printed article, 60 reflection | 63 | 37 |

COMPARATIVE EXAMPLE 2

Example 1 was repeated except that the amount of the acrylic acid addition product of dodecyl glycidyl ether (328 parts : about one mole per mole of isocyanate groups) was changed to 75 parts (A = 1.0 mol; NCO = 0.94 mol; B = 2.03 mol; NCO/A = 0.94; A/B = 4.35) to prepare a printing ink. When printing experiment was attempted by using this ink, the ink was increased in viscosity and gelled during the printing experiment.

COMPARATIVE EXAMPLE 3

Into a reactor were charged 80 parts of 1,6-hexane diisocyanate, 200 parts of neopentyl glycol diacrylate and 6.5 parts of hydroquinone. While maintaining the mixture at 45° C, 524 parts of an epoxy diacrylate obtained by addition reaction between a diepoxy compound (Epikote No. 828: Shell Chemical Co.) and acrylic acid were added dropwise thereinto, followed further by reaction at 60° C for 3 hours, to obtain a resinous composition.

An ink obtained by blending 100 parts of said resinous composition with 20 parts of Phthalocyanine Green and 3 parts of benzoin ethyl ether was provided for printing by an offset printing machine. The ink printability was not favorable and the lustre of the cured product by UV irradiation on art paper was considerably lower than that of the cured printed product obtained in Example 2.

COMPARATIVE EXAMPLE 4

Eighty (80) parts of 1,6-hexane diisocyanate were charged into a reactor. While maintaining the temperature at 45° C, 410 parts of an addition product of glycidyl oleate with acrylic acid were added dropwise over 2 hours, followed further by reaction at 65° C for 3 hours, to obtain a resinous composition.

An ink prepared by blending 100 parts of said resinous composition with 20 parts of Phthalocyanine Green and 3 parts of benzoin ethyl ether was printed on art paper and subjected to UV irradiation for 30 seconds under the same conditions as in Example 2. The ink film was not dried and cured at all.

COMPARATIVE EXAMPLE 5

300 parts of the same pentaerythritol triacrylate as used in Example 1 having a molecular weight of 298 and containing three acryloyl groups and one hydroxyl group per molecule, 260 parts of trimethylol propane triacrylate and 328 parts of an acrylic acid addition product of dodecyl glycidyl ether having an alkyl group of 12 carbon atoms and one hydroxyl group per molecule were subjected to cold blending. The resultant mixture was milled with 20 parts Benzidine Yellow on a triple roll to prepare an ink, which was printed and dried similarly as in Example 1. Curability of ink by electron beam irradiation was inferior as compared with Example 1. Lustre of the printed surface, wearing resistance and adhesive property to the substrate were not good.

What we claim is:

1. A substance of the formula:

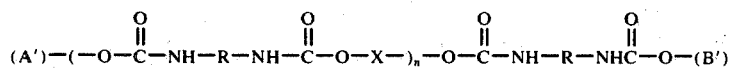

wherein A' consists of the residual group of compound (A) having a molecular weight of not more than 2000 and which is a di- or poly-acrylate or methacrylate of a polyol; B' is the residual group of a compound (B) which is the reaction product of glycidyl acrylate or glycidyl methacrylate with a semi-drying oil fatty acid or a drying oil fatty acid, or an addition product of α,β-unsaturated carboxylic acid with a monoepoxy compound having an alkyl or alkylene group with carbon atoms of 7 or more; X is the residual group of (A) or (B); R is the residual group of a diisocyanate compound; and n is zero or a positive integer.

2. A substance of the formula:

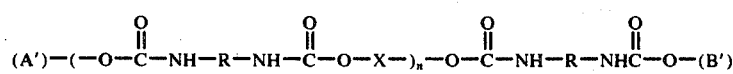

wherein A' consists of the residual group of compound (A) having a molecular weight of not more than 2000 and which is an addition product of a polyepoxy compound with an α,β-unsaturated carboxylic acid; B' is the residual group of a compound (B) which is a reaction product of glycidyl acrylate or glycidyl methacrylate with a semi-drying oil fatty acid or a drying oil fatty acid, or an addition product of α,β-unsaturated carboxylic acid with a monoepoxy compound having an alkyl or alkylene group with carbon atoms of 7 or more; X is the residual group of (A) or (B); R is the residual group of a diisocyanate compound; and n is zero or a positive integer.

3. A substance of the formula:

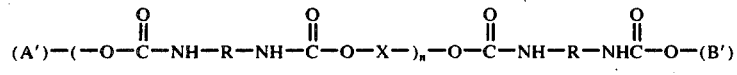

wherein A' consists of the residual group of compound (A) having a molecular weight of not more than 2000 and having at least two acryloyl or methacryloyl groups and one or more hydroxyl groups; B' is the residual group of a compound (B) which is an addition product of a polyepoxy compound with a semi-drying oil fatty acid or a drying oil fatty acid having an alkyl or alkylene group containing 7 or more carbon atoms; X is the residual group of (A) or (B); R is the residual group of a diisocyanate compound; and n is zero or a positive integer.

4. A substance of the formula:

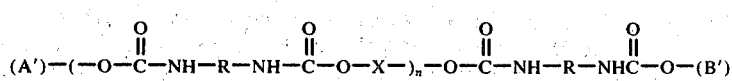

wherein A' consists of the residual group of compound (A) having a molecular weight of not more than 2000 and which is an addition product of glycidyl acrylate or glycidyl methacrylate with a carboxylic acid or an addition product of α,β-unsaturated carboxylic acid with a polyepoxy compound; B' is the residual group of a compound (B) which is an addition product of a polyepoxy compound with a semi-drying oil fatty acid or a drying oil fatty acid having an alkyl or alkylene group containing 7 or more carbon atoms; X is the residual group of (A) or (B); R is the residual group of a diisocyanate compound; and n is zero or a positive integer.

5. A process for preparing the substance of the formula:

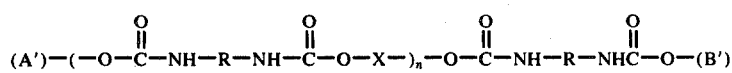

wherein A' consists of the residual group of compound (A) having a molecular weight of not more than 2000 and which is a di- or poly-acrylate or methacrylate of a polyol; and B' is the residual group of a compound (B) which is the reaction product of glycidyl acrylate or glycidyl methacrylate with a semi-drying oil fatty acid or a drying oil fatty acid, or an addition product of α,β-unsaturated carboxylic acid with a monoepoxy compound having an alkyl or alkylene group containing 7 or more carbon atoms; X is the residual group of (A) or (B); R is the residual group of a diisocyanate compound; and n is zero or a positive integer, which comprises reacting said compounds (A) and (B) with a diisocyanate compound.

6. A process for preparing a substance of the formula:

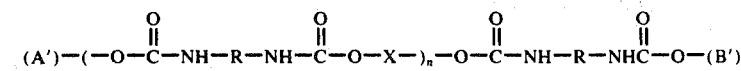

wherein A' consists of the residual group of compound (A) having a molecular weight of not more than 2000 which is an addition product of a polyepoxy compound with an α,β-unsaturated carboxylic acid; B' is the residual group of a compound (B) which is a reaction product of glycidyl acrylate or glycidyl methacrylate with a semi-drying oil fatty acid or a drying oil fatty acid, or an addition product of α,β-unsaturated carboxylic acid with a monoepoxy compound having an alkyl or alkylene group containing 7 or more carbon atoms; X is the residual group of (A) or (B); R is the residual group of a diisocyanate compound; and n is zero or a positive integer, which comprises reacting said compound (A) and (B) with a diisocyanate compound.

7. A process for preparing a substance of the formula:

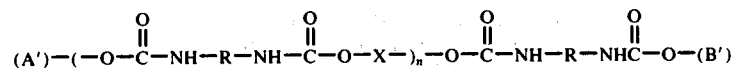

wherein A' consists of the residual group of compound (A) having a molecular weight of not more than 2000 and which is an addition product of glycidyl or glycidyl methacrylate with a carboxylic acid or of α,β-unsaturated carboxylic acid with a polyepoxy compound; and B' is the residual group of a compound (B) which is an addition product of a polyepoxy compound with a semi-drying oil fatty acid or a drying oil fatty acid having an alkyl or alkylene group containing 7 or more carbon atoms; X is the residual group of (A) or (B); R is the residual group of a diisocyanate compound; and n is zero or a positive integer, which comprises reacting said compounds (A) and (B) with a diisocyanate compound.

8. A process for preparing a substance of the formula:

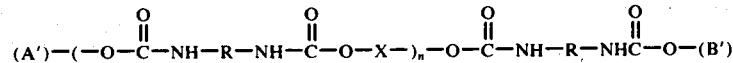

wherein A' consists of the residual group of compound (A) having a molecular weight of not more than 2000 and having at least two acryloyl or methacryloyl groups and one or more hydroxyl groups; B' is the residual group of a compound (B) which is an addition product of a polyepoxy compound with a semi-drying oil fatty acid or a drying oil fatty acid having an alkyl or alkylene group containing 7 or more carbon atoms; X is the residual group of (A) or (B); R is the residual group of a diisocyanate compound; and n is zero or a positive integer, which comprises reacting said compounds (A) and (B) with a diisocyanate compound.

* * * * *